Figure 3:
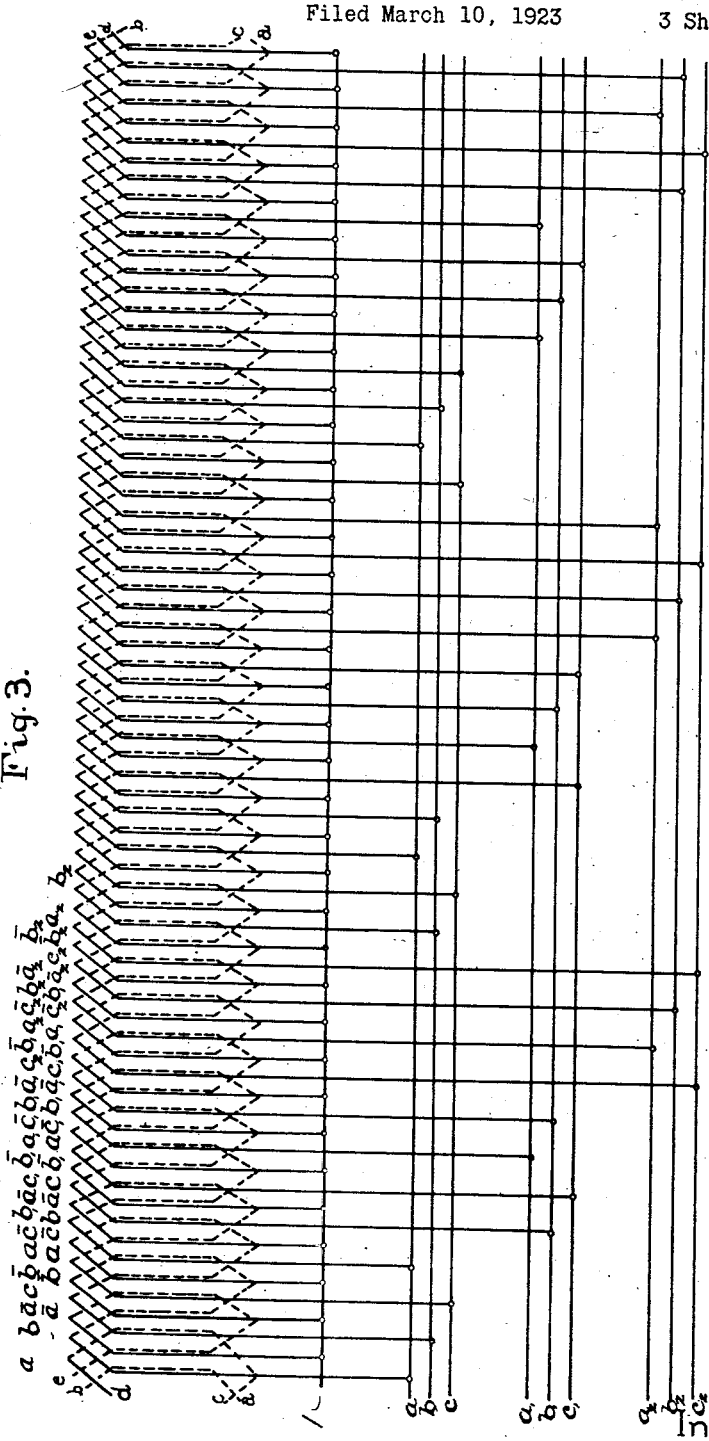

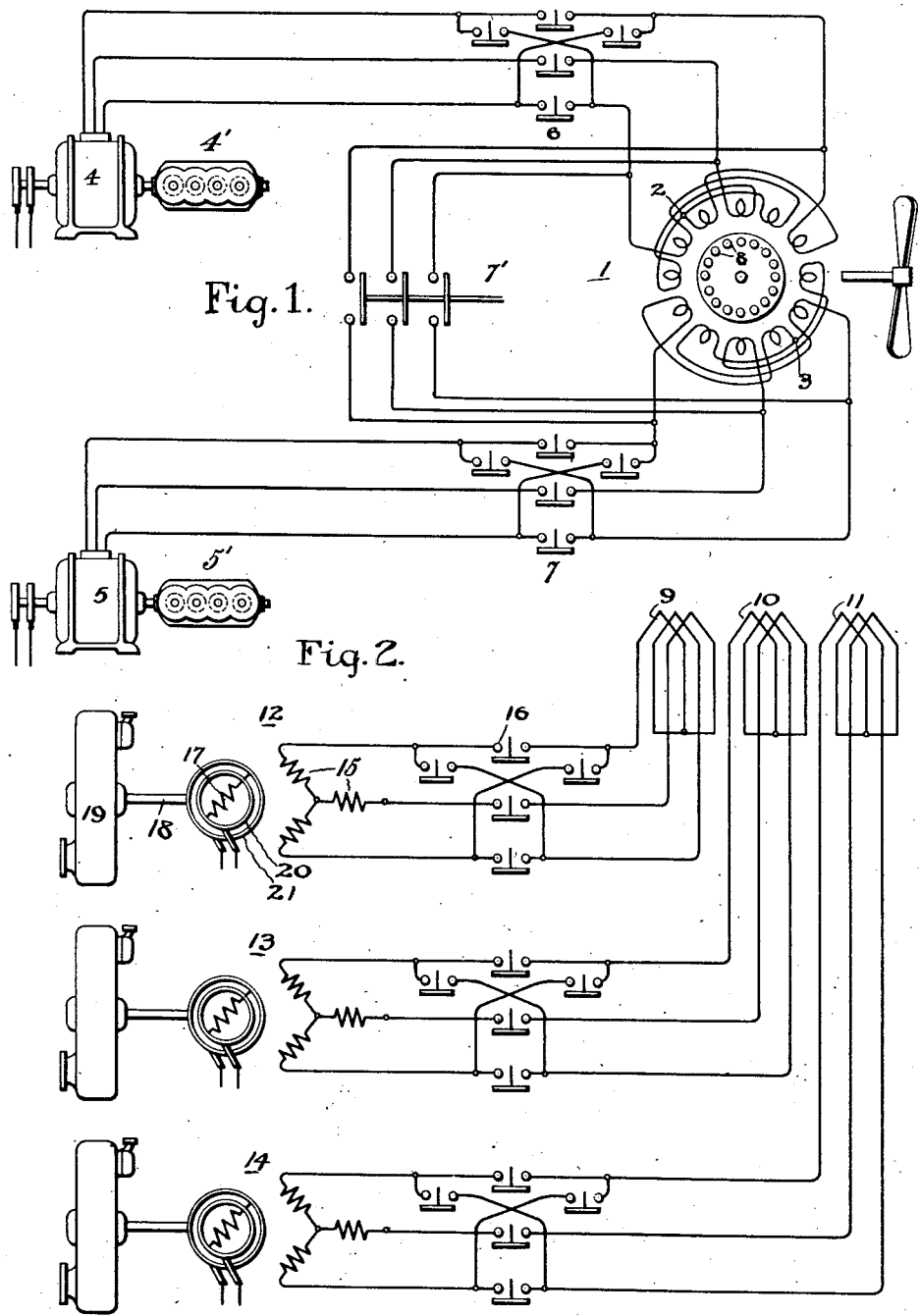

May 14, 1929.  C. MACMILLAN  1,713,188
SYSTEM OF SHIP PROPULSION
Filed March 10, 1923   3 Sheets-Sheet 2

Inventor:
Campbell Macmillan

May 14, 1929.  C. MACMILLAN  1,713,188
SYSTEM OF SHIP PROPULSION
Filed March 10, 1923   3 Sheets-Sheet 3

Inventor:
Campbell Macmillan

Patented May 14, 1929.

1,713,188

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

SYSTEM OF SHIP PROPULSION.

Application filed March 10, 1923. Serial No. 624,247.

My invention relates to power systems and especially to systems of electric ship propulsion in which a plurality of prime movers such as steam turbines or Diesel engines are utilized to drive the generators which supply power to the propeller motor.

In the application of the high speed Diesel engine to ship propulsion it has been found desirable to generate the power in several units of moderate size for the purpose of securing greater flexibility in the installation of the system and adding to the reliability of its operation. It is desirable, however, to avoid parallel operation of the generators when they are turbine driven and the parallel operation of generators driven by Diesel engines is still more objectionable. In the majority of cargo boats it is desirable to have one large propeller and, if this propeller is to be driven by a single motor of suitable size, the provision of means for avoiding the objections incident to the parallel operation of the generators becomes very important.

The main objection to direct parallel operation depends on the magnitude of the circulating currents which are caused by speed variations of the different generators and by the relative mechanical phase displacement of the different generator rotors even before any actual difference in speed is established. If two or more generators are operated in parallel and for any reason the speed of one is momentarily decreased there is produced a resultant electromotive force which sends a circulating current around the closed circuit formed by the parallel connected machines. This circulating current increases the load on the machines operating at normal speed and lightens the load on the low speed machine thereby tending to equalize the speeds of the various machines and to reduce the circulating current to zero. Due, however, to the inertia of the machines, they will swing beyond the position of no circulating current, which current will then be reversed and will tend to pull the two machines together again. The frequency of this swinging or hunting will be determined by the natural period of vibration of the machines and it may be greatly reduced by eddy currents in the pole faces, by the provision of damper windings and by the damping effect of the field windings. These circulating currents, however, also depend on the relative mechanical phase displacement of the different generator rotors and attain large values before any actual difference of speed is established. It therefore becomes necessary to provide means which operate independently of speed variations to eliminate the circulating currents.

An object of my invention is to provide a system of ship propulsion in which a single propeller motor may be efficiently and effectively driven from a plurality of different generators.

A further object of my invention is to provide a system of ship propulsion in which means independent of variation in generator speed are utilized for eliminating the circulating currents which tend to flow between the different generators.

A further object of my invention is to provide a power system in which the poles and circuits of the load motor are to a greater or less extent segregated and supplied with power from separate generators for the purpose of reducing and obviating the circulation of currents between the different generators.

Other objects and advantages will become apparent as my invention is considered in detail.

My invention will be better understood from the following description taken in connection with the accompanying drawings and its scope will be pointed out in the appended claims.

Figure 4:
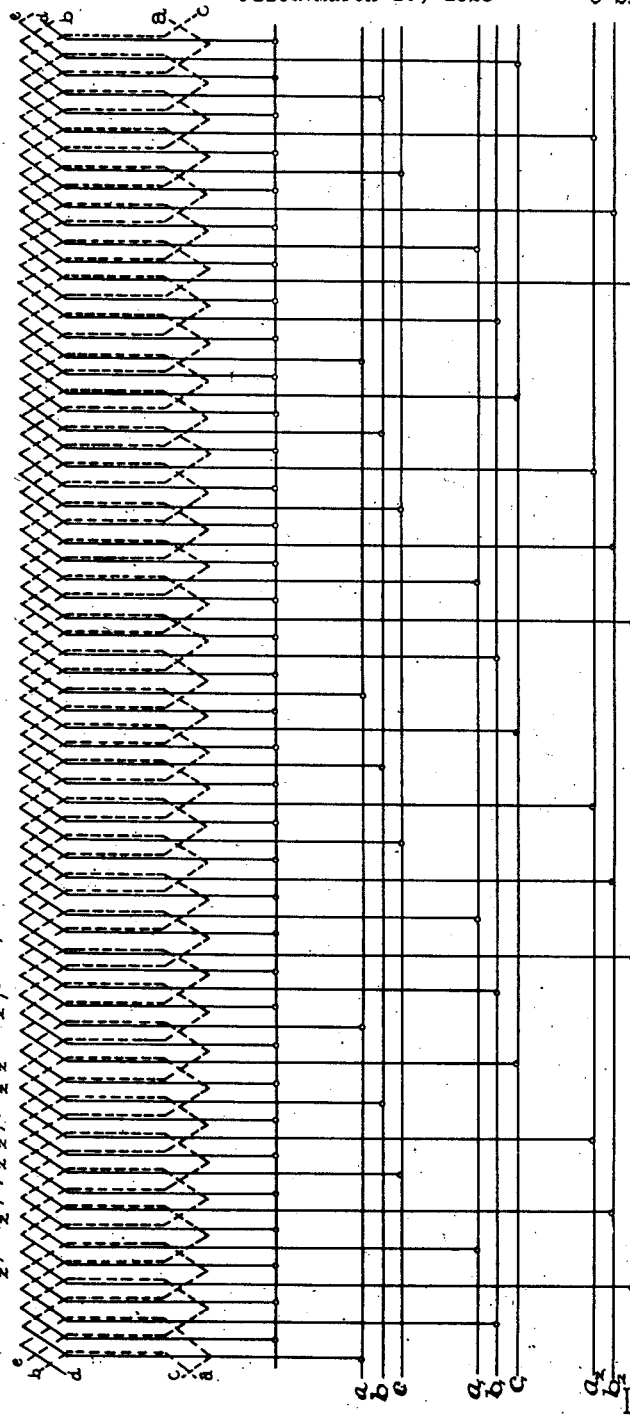

Referring now to the drawings, Fig. 1 shows a single propeller motor having two separate pole pairs arranged to be energized by different generators; Fig. 2 shows a motor winding having three sections each arranged to be energized by a different generator; Fig. 3 shows a motor winding arranged to be fed by three different three phase generators; and Fig. 4 shows a winding similar to that shown in Fig. 3 but arranged to offer less impedance to the flow of circulating current than the winding shown in Fig. 3.

In Fig. 1 a single propeller motor 1 is provided with two bipolar, star-connected, three phase circumferentially spaced windings 2 and 3 arranged to be supplied with power from generators 4 and 5 respectively through the reversing switches 6 and 7. The generators 4 and 5 are shown as arranged to be driven by Diesel engines 4' and 5'. The rotor of the motor 1 is shown as provided with a squirrel cage winding 8. By this scheme of connection, direct circulating currents are eliminated and the variations in current in the different circuits, while, in some respects equivalent to such circulating currents, are not established by phase displacement but require a definite change in the relative speed of the independent generators before any large changes of current can take place. There is in this case little tendency to accelerate any particular generator and engine or turbine which may fail to furnish its full share of the load. Such a generator will merely continue to supply power at a somewhat lower frequency and this will correspond to a slightly smaller slip in the corresponding section of the motor which continues to rotate at practically the same speed, but receives a smaller contribution to its total torque from the section under consideration. If this difference of frequency continues, the relative spacing of the motor poles is affected, and at the border of two adjacent sections of the motor stator winding the joint magnetomotive force of the two adjacent sections will undergo a periodic variation from zero to double normal value. The periodicity of this magnetomotive force is largely dependent upon the difference of the slip frequency in the adjacent sections.

The variations due to differences in the frequency of the energy supplied to the different sections of the motor have been found to introduce no serious difficulties and, with the exception of these variations, the different sections may be considered as independent motors on the same shaft. If the difference of slip becomes sufficient the generator which is falling behind will be driven by its section of the motor operating as an induction generator. The redistribution of current caused by this arrangement may cause some additional heating but the tendency to swinging or hunting, which occurs when the unequal load results merely in phase displacement, does not occur when the readjustment takes the form of slip difference.

Fig. 2 shows a motor primary winding which comprises three sections 9, 10 and 11 arranged to be supplied with power by generators 12, 13 and 14 respectively. The generator 12 is provided with a three phase stator winding 15 interconnected with section 9 of the motor through a reversing switch 16, and is also provided with a field winding 17 arranged to rotate with shaft 18 of the turbine 19. The field winding 17 has its terminals connected to slip rings 20 and 21 through which direct current may be supplied to the winding 17 from any suitable source. The means for supplying power to sections 10 and 11 of the motor are similar to those utilized in connection with section 9 of the motor primary winding as will be apparent from the drawing. While I have illustrated the various generators as driven by steam turbines, it is understood that my invention may be used in any case where a prime mover having characteristics similar to the steam turbine or Diesel engine is utilized to drive the generators which supply power to the various sections of the motor. The modification shown in Fig. 2 differs from that shown in Fig. 1 mainly in respect to the number of separate sections into which the primary winding of the motor is divided. By the division of the motor primary winding into a number of separate sections the operation of the system is rendered flexible and reliable. If one of the sections is damaged, the uninjured sections may be utilized to bring the ship into port at reduced speed. Even though non-corresponding generators and sections become inoperative for any reason, it is still possible to bring the ship into port at reduced speed by interconnecting a single operative section and generator.

If desired, a switch 7′ (Fig. 1) may be provided for connecting either generator to the non-corresponding section of the propeller motor so that in case of damage to either section or either generator, the ship may be brought into port at reduced speed. The connections from the switch 7′ to the motor sections should be made on the motor side of the reversing switches 6 and 7 and the switches 6, 7 and 7′ should be interlocked so that it is impossible to close these switches in a way which would connect the generators directly in parallel. In case of injury to one of the generators shown in Fig. 1, the different section of the motor winding may be connected in parallel to the uninjured generator, in which case the motor speed is controlled in response to change in the speed of the operating generator and the excitation of this generator is regulated to accommodate the generated voltage to the reduction in impedance caused by the connection of the sections in parallel. Similar switching arrangements may be provided in the case of Fig. 2.

The winding shown in Fig. 3 is of the two layer type; the top conductors being indicated by full lines and the bottom conductors being indicated by dotted lines. This winding is arranged to produce 12 or 12n-pole pairs when energized from the three separate three phase sources $a$—$b$—$c$, $a_1$—$b_1$—$c_1$, and $a_2$—$b_2$—$c_2$. Above the pairs of conductors are placed two letters arranged in each case to indicate the conductors in accordance with the manner of their connections to the various supply lines, a dash being placed above certain of the letters to indicate that they carry current 180 electrical degrees out of phase with that carried by those designated by the corresponding plain letter. The various coils are in each case connected between one of the supply lines and a common neutral conductor 1.

Instead of dividing the motor primary winding up into circumferentially spaced sections comprising groups of adjacent poles as was done in the case of the windings shown in Figures 1 and 2, the winding in this case is grouped in circumferentially spaced sections of adjacent phase belts energized from the same source. These sections are interconnected through the neutral conductor 1 and to a certain extent each section is magnetically interconnected with the sections immediately preceding and following it so that there is not the same independency of operation between the various generators which supply the windings as in the case where the sections are made up of separate groups of poles. In such a winding, however, the circulating currents are held within a reasonable value by reason of the considerable impedance of the path which they must follow in flowing from one source to the other.

The winding shown in Fig. 4 differs from that shown in Fig. 3 only in respect to the manner in which the various coils are connected to the supply lines. In Fig. 4 adjacent coils are connected so as to belong to different independent sections supplied from different generators. The particular case in which the two coil sides in the same slot belong to two different generator systems offers no special advantages over ordinary parallel operations since the impedance included in the path of circulating currents is but slightly greater than that which exists in a single uniformly distributed motor winding. In the case of the winding shown in Fig. 3 only three out of every eight slots contain conductors fed from different generators while in the case of the winding shown in Fig. 4 four out of every eight slots contain conductors fed from different generators. The circulating currents produced in the winding of Fig. 4 are therefore somewhat larger than those produced in the winding of Fig. 3. Under different circumstances different amounts of reactive choking effect of the circulating current may be found desirable and the particular winding to be used in each case will be determined by these circumstances.

Where the motor is provided with separate sections, as in Figs. 1 and 2, it is not necessary that the generators be in synchronism with each other but the best operation will be secured when the frequencies of the different generators are about equal. With this arrangement the necessity of synchronizing, in the sense of phasing in the different machines, is avoided and the operation of the system is correspondingly simplified. The generators connected to the type of winding shown in Figs. 3 and 4 should operate at practically the same frequency. In this case, one convenient way to connect in an additional generator, where one or more generators are already operating, is to bring the generator to be connected in up to approximately synchronous speed by adjusting the speed of its driving engine; then lowering the voltage of the generator or generators in operation by reducing the excitation; then short circuiting the field winding of the generator to be connected in and closing the line switches for the proper direction of phase rotation. The incoming generator may thus be brought practically into synchronism by induction motor operation, after which the field circuit of the incoming generator may be energized for normal operation.

My invention may be embodied in other forms than those shown and described and I, therefore, intend to cover by the appended claims all changes and modifications apparent to those skilled in the art and within the scope of my invention.

What I claim as new and desire to secure by Letters Patent of the United States, is:

1. A power system comprising a plurality of electric generators each driven by a separate prime mover subject to variations in speed and driving torque, a load motor having a primary winding divided into circumferentially spaced sections and means for connecting each of said sections to a different generator.

2. A system of ship propulsion comprising a propeller motor having its primary winding arranged in a plurality of separate circumferentially spaced sections each composed of a pole group, and a plurality of generators each of which is arranged to supply power to a different pole group whereby the flow of direct circulating currents between said generators is prevented.

3. A system of ship propulsion wherein the speed of a propeller is controlled by variation in the speeds of a plurality of prime movers comprising a plurality of generators, a plurality of prime movers for independently driving said generators, a propeller motor having its primary winding divided into circumferentially spaced sections, means for connecting each of said sections with a corresponding generator, and means for interconnecting any of said sections with a non-corresponding generator.

4. A power system comprising a plurality of polyphase alternating current generators, a plurality of prime movers subject to variations in speed and driving torque for independently driving said generators, a polyphase alternating current load motor having a primary winding divided into circumferentially spaced sections and means for connecting each of said generators to one of said sections.

5. A system of ship propulsion comprising a plurality of polyphase alternating current generators each driven by a different prime mover subject to variations in speed and driving torque, a polyphase alternating current propeller motor having a primary winding divided into circumferentially spaced sections each composed of a pole group and means for connecting each of said pole groups to one of said generators whereby the flow of direct circulating current between said generators is prevented.

6. In a system of ship propulsion a polyphase alternating current propeller motor having its primary winding divided into circumferentially spaced sections composed of pole groups, a plurality of polyphase alternating current generators each driven by a prime mover subject to variations in its speed and driving torque, means for interconnecting each of said generators with a corresponding pole group, and means for interconnecting any one of said generators with a non-corresponding pole group.

7. A system of ship propulsion comprising a propeller motor having its primary winding arranged in a plurality of separate sections each including the same number of poles, and a plurality of generators each arranged to supply current to a different one of said sections whereby the flow of direct circulating currents between said generators is prevented.

8. In a power system, the combination of a plurality of generators each driven by a prime mover subject to variations in its speed and driving torque, a load motor having a primary winding divided into a plurality of circumferentially spaced sections having conductors located in independent parts of its magnetic structure, and means for connecting said generators to said sections.

In witness whereof, I have hereunto set my hand this 9th day of March, 1923.

CAMPBELL MACMILLAN.